United States Patent
Worner

(10) Patent No.: US 6,345,783 B1
(45) Date of Patent: Feb. 12, 2002

(54) SPOOL RACK WITH CONNECTING SYSTEM

(75) Inventor: Christoph Worner, Baiersbronn (DE)

(73) Assignee: Memminger-IRO GmbH (DE)

(*) Notice: Subject to any disclaimer, the term of this patent is extended or adjusted under 35 U.S.C. 154(b) by 0 days.

(21) Appl. No.: 09/548,713

(22) Filed: Apr. 13, 2000

(30) Foreign Application Priority Data

Apr. 13, 1999 (DE) .......................................... 199 16 483

(51) Int. Cl.[7] .................... B65H 49/38; B65H 75/18; F16B 9/02; A47F 5/14; F16L 41/08
(52) U.S. Cl. ................................ 242/594.6; 242/131.1; 242/597.8; 403/260; 403/258; 211/182
(58) Field of Search ........................... 242/131.1, 594.6, 242/597.8; 403/260, 258, 256; 211/182

(56) References Cited

U.S. PATENT DOCUMENTS

| | | | | |
|---|---|---|---|---|
| 932,522 A | * | 8/1909 | Wardwell | 242/131.1 |
| RE17,441 E | * | 9/1929 | Tasman | 403/260 X |
| 2,108,398 A | * | 9/1938 | Allen, 3rd | 403/260 |
| 3,867,048 A | * | 2/1975 | Endzweig | 211/182 X |
| 3,884,588 A | * | 5/1975 | Apple, Sr. | 403/256 X |
| 4,386,870 A | * | 6/1983 | Baroody | 403/260 X |
| 5,230,581 A | * | 7/1993 | Deng | 403/260 X |
| 5,727,897 A | * | 3/1998 | Liu | 403/260 X |
| 6,227,752 B1 | * | 5/2001 | Friedrich | 403/260 X |

FOREIGN PATENT DOCUMENTS

| | | |
|---|---|---|
| DE | 2 331 542 | 6/1973 |
| DE | 7338340 | 10/1973 |
| DE | 79 25 578 | 9/1979 |
| DE | 84 28 056.5 | 9/1984 |
| DE | 298 19 815 | 11/1998 |

* cited by examiner

Primary Examiner—Donald P. Walsh
Assistant Examiner—Minh-Chau Pham
(74) Attorney, Agent, or Firm—Leydig, Voit & Mayer, LTD

(57) ABSTRACT

A spool rack (1) composed of carrying and connecting struts includes a connecting system for the struts connecting element (15) which are inserted in each case into one of the struts. The connecting element has a pressure transmitting portion (23) against which there is supported a screw bolt (17) which is screwed into the threaded socket (16) of the other strut to be connected. To enable mounting in correct position, the connecting element (15) is releasably fixable in the corresponding strut.

13 Claims, 3 Drawing Sheets

SPOOL RACK WITH CONNECTING SYSTEM

FIELD OF THE INVENTION

The invention relates generally to a rack or creel for receiving spools on which thread material is wound and, more particularly to a spool rack having interconnected tubular carrying and connecting struts on which are arranged spool holders.

BACKGROUND OF THE INVENTION

Spool racks having interconnected carrying and connecting struts that define a standable frame that carries a plurality of spool holders are used extensively as so-called side racks for circular knitting machines. This type of spool rack is also used, however, for other applications involving feeding threads, wires or similar filament-form material to a common processing or treatment location.

For example, a spool rack for a circular knitting machine is disclosed in DE GBM 7 338 340. This spool rack is constructed from individual elements which are joined together into a round or flat rack. The individual elements comprising the rack consist of vertical carrying bars and horizontal connecting bars each having a tubular construction with a rectangular cross-section. Slip-on holders for the spools are arranged on the carrying bars and corresponding thread-guide elements are provided to define the desired thread running paths. Since such spool racks are necessarily very bulky structures, the individual elements are generally supplied disassembled and are put together at the end-use location. The DE GBM 7 338 340 reference does not describe in detail how the individual bars are connected together. However, in practice, the individual bars are typically assembled using a variety of different connectors, including, for example, plug connectors and pipe clips.

As a result of the ever increasing weight of the spools used on such racks, considerable mechanical demands are placed on the spool rack, particularly in relation to the stability of the rack and the strength of the connections of the individual struts of the rack. Moreover, as will be appreciated, assembly of the spool rack should be simple so that untrained personnel can carry it out. Finally, the connectors used to assemble the struts should have a minimum of easy-to-handle individual parts.

OBJECTS AND SUMMARY OF THE INVENTION

Accordingly, in view of the foregoing, a general object of the present invention is to provide a spool rack which has a mechanically sound design and is easy to assemble.

In accordance with these and other objects of the present invention, a spool rack is provided in which the individual struts of the rack are assembled together at particular connection points using respective connecting assemblies that include a connecting element that is slidable into a first tubular strut and a threaded socket that is slidable into a second mating tubular strut. The connecting element includes a pressure transmitting portion arranged to engage the inner wall of the corresponding first strut. A holding portion is connected with the pressure transmitting portion for releasably fixing the connecting element in the strut. When assembled, the two struts are joined together by a screw bolt which is supported by the pressure transmitting portion, and extends through a passage bore in the wall of the first strut and is received in the threaded socket.

A very stable, firm connection is produced by the combination of the threaded socket that is inserted into the second strut and the pressure transmitting portion that is inserted into the first strut for supporting the screw bolt. Because the pressure transmitting portion can be detachably fixed in the strut by the holding portion before the screw bolt is inserted, the assembly of the spool rack is substantially easier. The pressure transmitting portions only have to be inserted into the particular struts until they are in the correct position at the respective connection points, where they are fixed in position by the holding portions. The carrying and connecting struts then can be screwed together easily at the connecting points.

The connecting element can be constructed of a plastic material as the connecting element does not include any force-absorbing threads, parts or the like that would impose special demands on the material strength. Instead, it is only necessary that the connecting element absorb the pressure force resulting from the tightening of the screw bolt and transfer the force to the inner wall of the strut. To achieve this, in the case of struts in the form of cylindrical tubes, the pressure transmitting portion should include a substantially cylindrical bearing surface for engaging the inner wall of the strut. As is the case with the entire connecting element, including the pressure transmitting portion, the bearing surface does not impose particular high demands on the required manufacturing precision. Similarly, the form and diameter tolerance of the inner surface of the tubular strut does not have to be manufactured with high precision. Accordingly, for example, welded tubes can also be used directly as the struts, as the present invention is in no way restricted to the use of cylindrical tubes as the struts. To mention only a few examples, the tubular struts can be constructed in the form of polygonal profiled tubes or the like having rectangular or square cross section. The holding portion of the connecting element can comprise a holding member in the form a cylindrical lug added to the pressure transmitting portion that positively cooperates with, or fits within, the passage bore in the strut or as a part which engages a projection on the inner wall of the strut. As will be appreciated, the invention is not restricted to these examples. When the connecting element is inserted into the strut, the holding portion enables the connecting element to be fixed with respect to the passage bore at the particular connecting point in a simple manner. The fixing of the connecting element is facilitated if the holding portion has an elastic supporting portion connected with the pressure transmitting portion which allows the pressure transmitting portion to be pressed against the inner wall of the strut. This construction enables the pressure transmitting portion to be resiliently positioned, with respect to for example the passage bore, at the connection point during the insertion of the pressure transmitting portion into the strut.

The elastic supporting portion includes, in one advantageous embodiment, an essentially hairpin-shaped spring part, which is either molded as one piece onto the pressure transmitting portion or is joined with the pressure transmitting portion as a separate part, for example in the form of a metal spring leaf. Alternatively, the elastic supporting portion can comprise, for example, a compression spring which is operable between the pressure transmitting portion and the inner wall of the strut. The hair pin shaped construction of the spring part is particularly suitable when the connecting element is constructed as a one-piece plastic part.

The pressure transmitting portion and the supporting portion suitably include, in each case, a continuous bore for the screw bolt with the two bores being aligned with one another. In order to facilitate the insertion of the connecting element into the tubular strut, the connecting element can be constructed such that at least the elastic supporting portion has elements which allow a tool, for example tongs, to be applied so as to press the supporting portion against the pressure transmitting portion as described in greater detail below.

Finally, in order to permit some adjustability of the struts joined with one another at the connection points, the passage bore can alternatively be formed as a cylindrical or a longitudinal hole in the longitudinal or circumferential direction of the strut. In this context, it should be noted that the use of the connecting element also enables struts to be connected at the connection points, not only with other struts, but also with a wall or the like, in which a corresponding threaded socket is provided.

These and other features and advantages of the invention will be more readily apparent upon reading the following description of a preferred exemplary embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
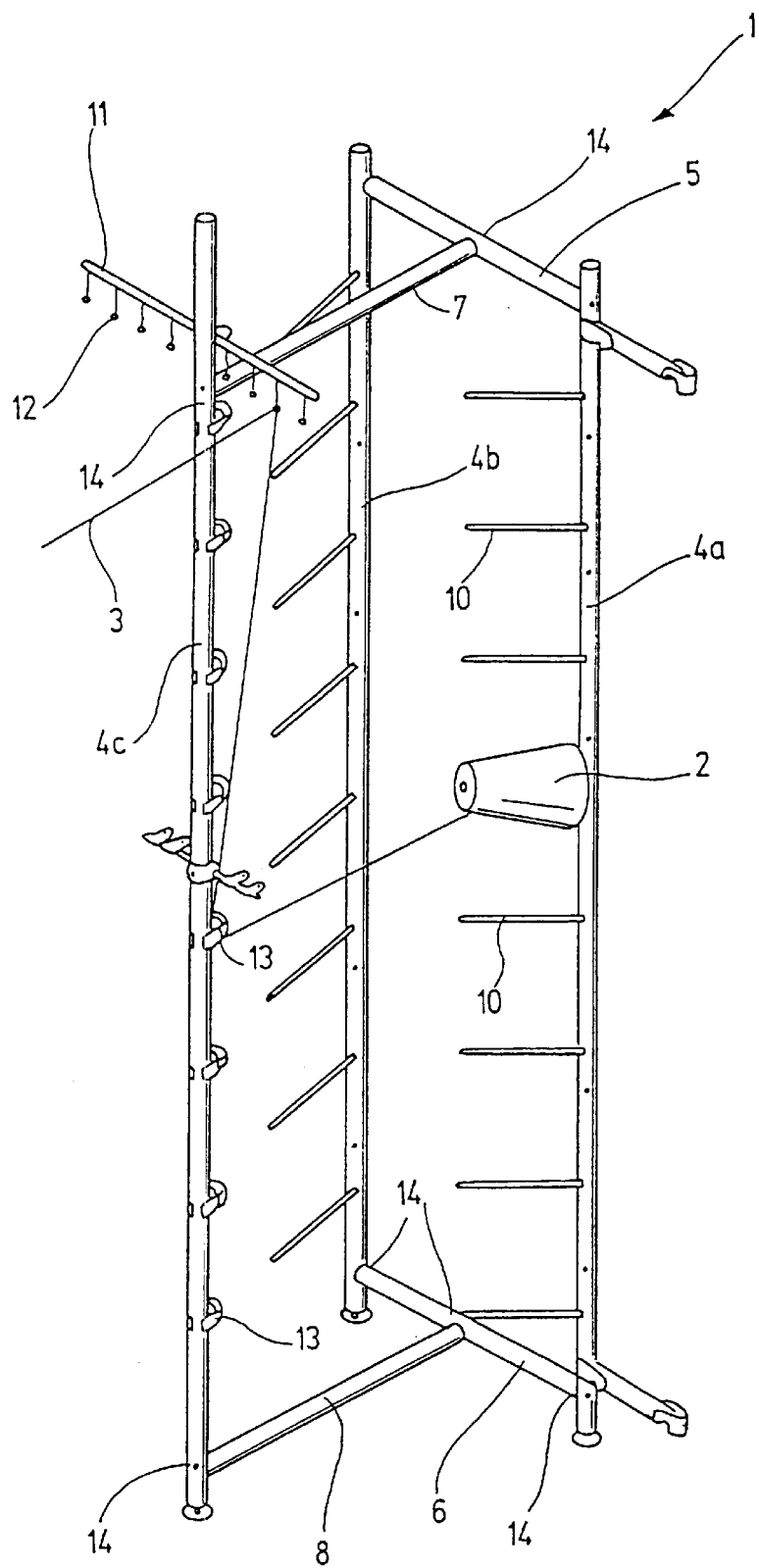
FIG. 1 is a schematic perspective view of an illustrative spool rack constructed in accordance with the present invention.

Referring now more particularly to FIG. 1 of the drawings there is shown an illustrative spool creel or rack 1 in its operative position, which serves for the holding of a large number of yarn bobbins or spools 2 which can be either in a ready state or, as shown with respect to the illustrated spool 2, from which a thread 3 can be drawn off for a thread using machine (not shown), such as a circular knitting machine or the like. The illustrated spool rack 1 contains three vertically standing carrying struts 4a, 4b, 4c, which are arranged in parallel spaced relation from one another. The carrying struts are arranged so as to form the corners of an equilateral triangle, the apex of which is the carrying strut 4c. The carrying struts 4a, 4b, 4c are joined together by horizontal connecting struts 5, 6, 7 and 8, of which two connecting struts 5 and 6 fasten together the carrying struts 4a, 4b adjacent their upper or their lower ends, while the other two connecting struts 7 and 8, which extend so as to form a T-shape with the connecting struts 5, 6, hold the carrying strut 4c on the connecting struts 5 and 6.

All of the carrying and connecting struts 4a, 4b, 4c; 5 to 8, in the illustrated embodiment, comprise cylindrical tubes, which are made, for example, of steel or of a light weight metal such as aluminum or the like. The carrying and connecting struts all have the same inside and outside diameters. These tubes can be seamlessly drawn, however, tubes that have a welded longitudinal seam can also be used. The invention is also not restricted to spool racks that are assembled from carrying and connecting struts in the form of cylindrical tubes, rather, it also extends to racks whose carrying and connecting struts consist of profile tubes having any arbitrary cross section, for example pipes of rectangular, square or polygonal cross section. Moreover, there are not any restrictions with regard to the choice of material. Thus, for example, plastic tubes can be used. Finally, it will be appreciated that the spool rack shown in FIG. 1 is only a simple embodiment of a spool rack which has been selected in order to illustrate the invention. Of course, the invention is applicable to all known forms of spool racks, such as round or flat racks, ventilated or non-ventilated racks and other racks used in the industry for different particular end uses.

Creel holders 10 for the yarn bobbins 2 are fastened to the carrying struts 4a, 4b, 4c, in a manner known in the spool rack art. Furthermore, thread-guide and deflecting arrangements in the form of eyelets and the like (schematically referenced as 11 and 12) are provided in the spool racks as is also known in the art. Additionally, Each of the threads 3 runs over a thread brake 13 as well as possibly a knot catcher or other similar device. These elements are well known and, therefore, not described in detail.

The connection of the connecting struts 6, 8 and 7, 5 with one another, as well as with the carrying struts 4a, 4b, 4c, occurs at connection points 14 as described below and shown in FIGS. 2–5. In order to describe the present invention, the connection point 14 between the carrying strut 4a and the connecting strut 5 is used below. It will be appreciated that the construction of the other connecting points 14 can be identical.

Figure 2:
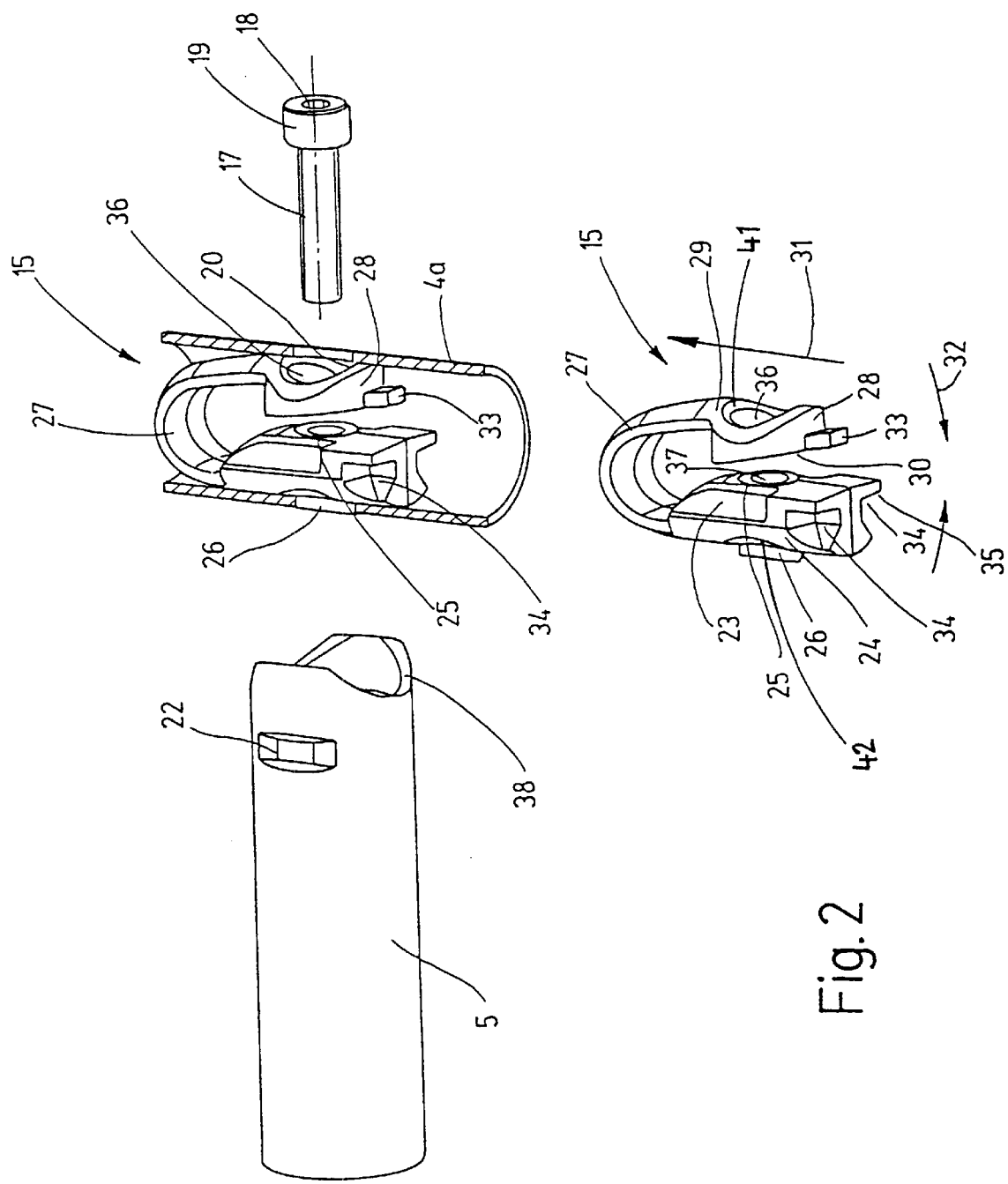
FIG. 2 is a partially cutaway, exploded perspective view of a connecting point of the spool rack of FIG. 1 also showing the connecting element removed from the strut.

In accordance with the invention, the connection between the connecting strut 5 and the carrying strut 4a is achieved through a connecting system that includes a connecting element 15 that is insertable into the tubular carrying strut 4a as shown in FIG. 2. The connecting system further includes a threaded socket 16 (FIG. 3) and a threaded bolt 17 that can be screwed into the socket 16. The threaded bolt 17 is formed with an internal hexagon wrench (or key) attachment 18 in its head 19 and to which there is associated a passage bore 20 constructed as step bore in the carrying strut 4a. The cylindrical threaded socket 16 is constructed with an annular groove 21, into which at least one bead 22 impressed into the wall of the connecting strut 5 (FIG. 2) can engage, and by which the threaded socket 16 is positively oriented in a fixed position in the connecting strut 5.

The illustrated connecting element 15 is constructed of a single piece of a synthetic material. Alternatively, however, the connecting element can also be formed from metal, for example, by pressure casting, or in several parts from suitable materials. The connecting element includes a pressure transmitting portion 23 which carries a bearing surface 24 adapted to the inner wall of the carrying strut 4. In the illustrated embodiment, the bearing surface is essentially partially cylindrical with a cylinder diameter corresponding to the inside diameter of the tubular carrying strut 4a. On the side arranged opposite the bearing surface 24, the pressure transmitting portion 23 includes an engagement surface 25 having an essentially flat configuration for the screw head 19 of the bolt 17. The pressure transmitting portion 23 is smooth but it may also be ribbed or otherwise textured in a suitable manner. It must in any case, however, be capable of absorbing the pressure forces produced by the tightened screw bolt 17.

Holding means for releasably fixing the connecting element 15 in the carrying strut are connected with the pressure transmitting portion 23. These holding means include a holding member molded in the form of a journal-like cylindrical lug 26 onto the pressure transmitting portion 23 in the area of its bearing surface 24. The outer diameter of the cylindrical lug corresponds to the diameter of the passage bore 20 so that when the connecting element 15 is inserted into the carrying strut 4a, the cylindrical lug 26 can fit into the passage bore 20 and thereby set the connecting element 15 in a fixed position relative to the carrying strut 4a. Furthermore, an elastic supporting portion is connected with the pressure transmitting portion 23. The elastic supporting portion comprises a molded-on, essentially hairpin-shaped spring part 27 which connects via a shank to a face side of the pressure transmitting portion 23 and includes an annular flange 28 formed on the end of the shank.

The annular flange 28 is provided on its outer side (upper side in FIG. 2), which faces the inner wall of the carrying strut 4a, with a supporting surface 29 which, in this case, has a partially cylindrically curved configuration. An essentially flat bearing surface 30 is allocated to the supporting surface 29 on the inside of the annular flange 28. The axial height of the annular flange 28 is dimensioned in such a manner that the connecting element 15 with the elastically compressed spring part 27 can be inserted into the tubular carrying strut 4a, as shown in FIG. 2 by an arrow 31.

In order to facilitate the elastic compression of the annular flange 28 and of the pressure transmitting portion 23 required for the sliding of the connecting element 15 into the carrying strut 4a (referenced by arrows 32 in FIG. 2), elements are provided on the annular flange 28 and on the pressure transmitting portion 23 for the application of a tool, such as for example a pair of tongs. In the illustrated embodiment, these elements consist of a projecting lug 33 molded on the annular flange 28 on the side opposite the spring part 27, and two recesses 34 provided on the opposite side of the pressure transmitting portion 23. The two recesses 34 are bounded on the side facing the flat engagement surface 25 by a tool engagement surface 35 which can be engaged by, for example, a tong-jaw.

Continuous bores 36, 37 extend through the annular flange 28 and the pressure transmitting portion 23 for the screw bolt 17, from which the bore 37 runs coaxially through the cylindrical lug 26. The bore 36 in the annular flange 28 has a diameter suitable for receiving the screw head 19, that is larger than the bore 37 in the pressure transmitting portion 23 intended for the shaft of the screw bolt 17.

Figure 3:
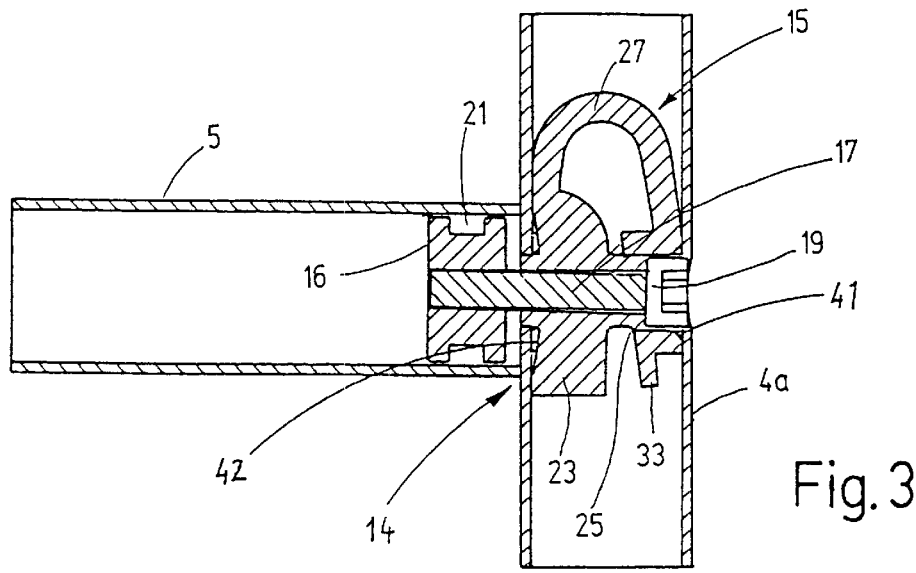
FIG. 3 is an enlarged, schematic axial section view of a connecting point of the spool rack according to FIG. 1.
Figure 4:
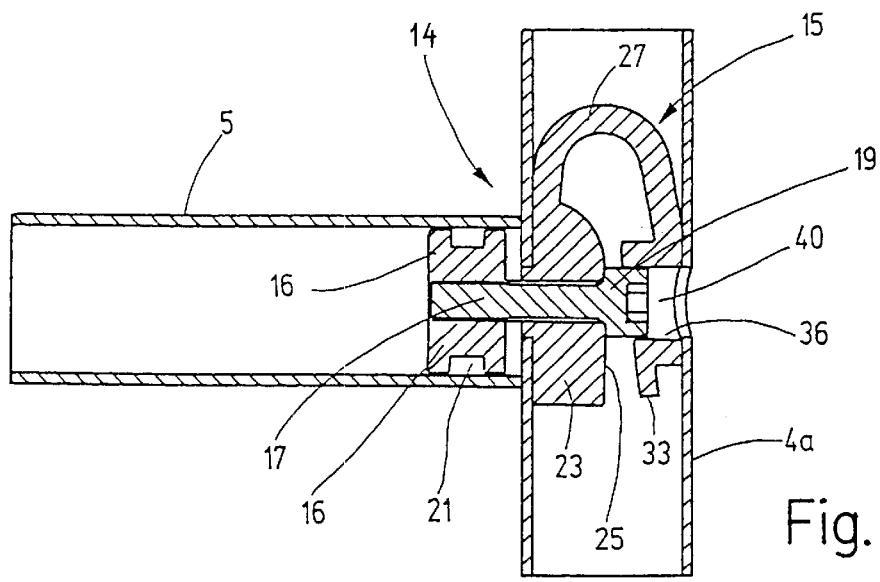
FIG. 4 is an enlarged, schematic axial section view of an alternative embodiment of a connecting point of the spool rack.

In the embodiment of the invention illustrated in FIGS. 1–3, in order to connect the connecting strut 5 with the carrying strut 4a, the carrying strut 4a is first provided with a passage bore 20 in the appropriate position for the connecting point 14. Then, a connecting element 15 is taken, elastically compressed in correspondence to the arrows 32 of FIG. 2, and inserted in the direction of the arrow 31 into the carrying strut 4a until its projection 26 comes to rest in the passage bore 20.

When the connecting element 15 is released, it is fixed in position in the carrying strut 4a because the freed spring part 27, presses the bearing surface 24 and the opposing supporting surface 29 against the inner wall of the tubular carrying strut 4a.

The screw bolt 17 can then be slid into the passage bore 20, and the bores 36, 37 of the connecting element 15 and screwed together with the threaded socket which has been inserted into the connecting strut 5 and fixed there by means of the bead 22 or by crimping. On the end of the connecting strut facing the carrying strut 4a, the connecting strut 5 is recessed, for example in a semi-circular configuration, at the point referenced as 38 in FIG. 2. The connecting strut is thereby fitted onto the cylindrical form of the carrying strut 4a, so as to produce an assembly that provides good resistance to twisting and turning movements.

When the screw bolt 17 is tightened, it rests on the flat engagement surface 25 of the pressure transmitting portion 23 which, in turn, uniformly distributes the pressure force initiated by the head 19 of the screw bolt 17, over its bearing surface 24, onto the inner wall of the carrying strut 4a, so that a secure, highly loadable connection between the connecting strut 5 and the carrying strut 4a is produced. Since the screw head 19 is received in the bore 36 of the annular flange 28 of the connecting element 15 when the screw bolt 17 is tightened, the screw head cannot hamper the transfer of the force of the screw bolt 17 into the pressure transmitting portion 23. Simultaneously, since the head 19 of the screw bolt 17 is lodged in the carrying strut 4a, the head is protected.

In cases in which a certain amount of adjustability is desired at the particular connecting point 16 during assembly, the passage bore 20 can also be constructed as an oblong hole, the axis of which is oriented in the longitudinal or circumferential direction with respect to the strut. The frictional connection between the interconnected struts which achieved by tightening the screw bolt 17 generally suffices for a firm, loadable connection, so that it is possible to dispense with the closure generated by a cylindrical passage bore 20.

The blind-hole depression 40 caused by the sinking of the screw head 19 into the wall of the carrying strut 4a (FIG. 4) generally does not cause any trouble with the assembly; it can, however and if necessary, be closed by a simple pressed-in closure plug. Alternatively, the pressure transmitting portion 23, however, can also be constructed so that in the mounted state the screw head 19 substantially closes the passage bore 20 in the wall of the carrying strut 4a. To this end, in the embodiment of the invention shown in FIG. 3, the support surface 25 is arranged on a sleeve-like continuation 41 molded onto the pressure transmitting portion 23. The continuation 41 fits into the bore 16 of the annular flange 28 and has an axial length such that in the mounted state, the face surface of the screw head 19 approximately closes off the outer surface of the carrying strut 4a. This embodiment provides additional strength to the connection due to the fact that the screw head 19 is completely supported in the lateral direction on the wall of the passage bore 20.

Figure 5:
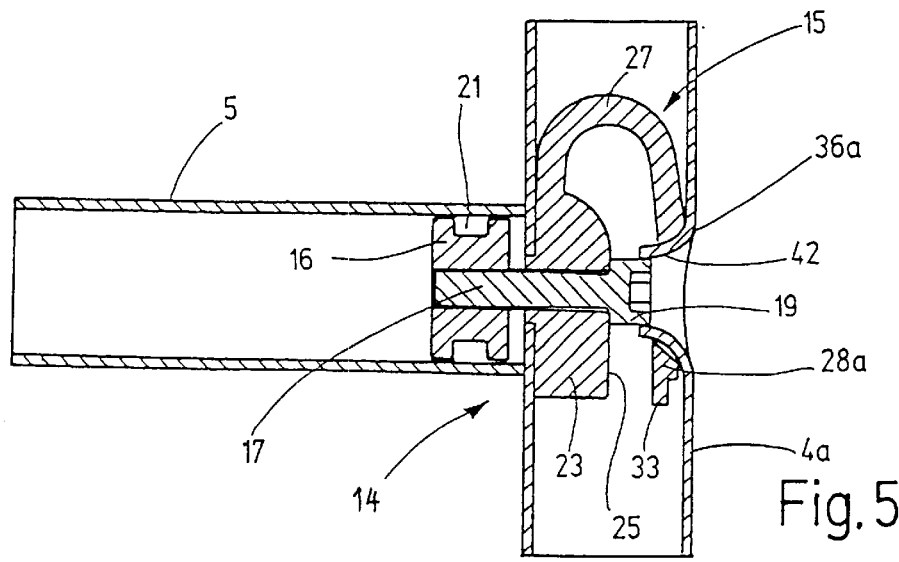
FIG. 5 is an enlarged, schematic axial section view of another alternative embodiment of a connecting point of the spool rack.

This advantage also applies to the further modified embodiment shown in FIG. 5, in which the wall of the carrying strut 4a is drawn inward in a funnel shape on the side opposite the connecting point 14, as is illustrated at reference number 42. With this embodiment of the invention it is also possible to eliminate the cylindrical lug 26 which engages with the passage bore 20, because the initial fixing of the connecting element 15 in the carrying strut 4a can occur via the annular flange 28a of the connecting element 15, the conical bore 36a of which corresponds to the diameter of the drawn-in wall part 42 forming a projection.

In sum, it will be appreciated that the connecting element 15, as noted above, can also consist of several parts. Thus, for example, it is possible to configure spring part 27 in the form of a metal pressure spring which is connected with the pressure transmitting portion 23 or to replace the spring part 27 with a screw spring or an otherwise formed spring element that is connected either as one piece or as a separate part, with the pressure member 23.

The invention has been described with the aid of a connecting point 14 between a carrying strut and a connecting strut. The invention by its nature can be used for all types of tubular parts, in which context a tubular part which is comparable to the carrying strut 4a of the illustrated embodiment is conceivable which is to be fastened by means of the threaded bolt 17, not to an outgoing strut but to a fixed part, for example to a wall which includes a corresponding threaded hole.

The passage bore 20 consisting of a step bore 20 in the carrying strut 4a is generally produced by drilling or stamping. A boring or punching ridge arises on the interior of the strut which, depending on the quality of the tools used, is more or less pronounced. In order to avoid an impairment of the proper seating of the pressure transmitting portion 15 in the carrying strut 4a, as best shown in FIG. 2, the bore 36 in the annular flange 28 is provided with a truncated conical chamfering 41, which is formed in the area of the supporting surface 29. For the same reason the projection 28 is surrounded by approximately truncated-conical embedded chamfering 42 arranged in the pressure transmitting portion 23 in the area of the bearing surface 24. Because the connecting piece 15 has a depression surrounding the bore 36 and the bore 37 on its two opposing sides in the shape of the chamfering 41 or of the chamfering 42, does not matter from which side the passage bore 20 is drilled or stamped into the carrying strut 4a. Furthermore, the embedded chamfering 42 also provides the advantage that the initiation of the force from the bearing surface 24 into the inner wall of the carrying strut 4a is shifted radially outward away from the edge of the passage bore into the vicinity of the wall of the connected connecting strut 5. Accordingly, the support of the connecting strut 5 on the outer wall of the carrying strut 4a is further improved. This is important particularly if the screw bolt 17 is tightened excessively tight, so that the pressure transmitting portion 23 undergoes a certain flexure in the area of the bore 37.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A spool rack for receiving spools on which thread material is wound, the spool rack comprising:

a plurality of first and second tubular struts;

creel holders arranged on the first or second tubular struts for supporting spools; and a connecting system for joining the each of the first tubular struts together with a respective one of the second tubular struts at respective connecting points, the connecting system including at each respective connecting point a connecting element slidable into the first tubular strut, a threaded socket insertable into the second tubular strut and a screw bolt, the connecting element having a pressure transmitting portion which is arranged to engage an inner wall of the first tubular strut and a holding portion connected to the pressure transmitting portion for releasably fixing the connecting element in the first strut, the screw bolt being supported on the pressure transmitting portion and extending through a passage bore in the wall of the first tubular strut and being threadably received in the threaded socket so as to join together the first and second struts.

2. The spool rack according to claim 1 wherein the connecting element comprises a synthetic material.

3. The spool rack according to claim 1 wherein the pressure transmitting portion includes a bearing surface for engaging the inner wall of the first strut, the bearing surface being configured so as substantially correspond to the shape of the inner wall of first strut.

4. The spool rack according to claim 3 wherein the pressure transmitting portion includes an engagement surface for the axially supporting the screw bolt, the engagement surface being spaced from the opposing bearing surface such that when the screw bolt is firmly tightened, the screw bolt essentially closes off the outer wall in the passage bore.

5. The spool rack according to claim 1 wherein the holding portion comprises a holding member arranged to cooperatively engage the passage bore of the first strut.

6. The spool rack according to claim 5 wherein the holding member is a cylindrical projection on the bearing surface of the pressure transmitting portion which fits into the passage bore.

7. The spool rack according to claim 5 wherein the holding member comprises a projection on the inner wall of the first strut.

8. The spool rack according to claim 1 wherein the holding portion includes an elastic supporting portion connected with the pressure transmitting portion for pressing the pressure transmitting portion against the inner wall of the first strut.

9. The spool rack according to claim 8 wherein the elastic supporting portion includes a substantially hairpin shaped spring part carried by the pressure transmitting portion.

10. The spool rack according to claim 8 wherein the pressure transmitting portion and the elastic supporting portion each include a continuous bore for receiving the screw bolt, the bores being adapted such so as to receive at least part of a head of the screw bolt.

11. The spool rack according to claim 8 wherein the supporting portion includes element for receiving a tool for pressing the elastic supporting portion against the pressure transmitting portion.

12. The spool rack according to claim 11 wherein the tool receiving elements include a projecting lug arranged on the elastic supporting portion and a recess on the pressure transmitting portion.

13. The spool rack according to claim 1 wherein the passage bore is configured as an oblong hole.

\* \* \* \* \*